United States Patent [19]

Wallentine et al.

[11] Patent Number: 4,831,246

[45] Date of Patent: May 16, 1989

[54] LARGE ANGLE OFF-AXIS BEAM STEERING OF A PHASED TELESCOPE ARRAY

[75] Inventors: Patricia J. Wallentine, Albuquerque, N. Mex.; Mark G. Baciak, West Melbourne, Fla.; Richard A. Carreras; Elinor L. Coates, both of Alberquerque, N. Mex.; David G. Haralson, Fairborn, Ohio

[73] Assignee: The United States of America as represented by the Secretary of the Air Force, Washington, D.C.

[21] Appl. No.: 181,480

[22] Filed: Apr. 14, 1988

[51] Int. Cl.$^4$ ............................................. G01J 1/20
[52] U.S. Cl. .................................. 250/20 J; 356/141
[58] Field of Search ......................... 250/201, 201 R; 356/141, 152, 561

[56] References Cited

U.S. PATENT DOCUMENTS

| | | | |
|---|---|---|---|
| 3,023,315 | 2/1962 | Muskat | 250/201 |
| 3,902,084 | 8/1975 | May, Jr. | 310/26 |
| 3,981,566 | 9/1976 | Frank et al. | 350/285 |
| 4,203,654 | 5/1980 | Ellis | 350/285 |
| 4,319,839 | 3/1982 | Durran | 356/153 |
| 4,576,449 | 3/1986 | Ruger | 350/500 |
| 4,639,586 | 1/1987 | Fender et al. | 250/201 |
| 4,660,941 | 4/1987 | Hattori et al. | 350/487 |
| 4,667,090 | 5/1987 | Carreras et al. | 250/201 |
| 4,689,758 | 8/1987 | Carreras | 364/561 |
| 4,740,677 | 4/1988 | Carreras et al. | 250/201 |

Primary Examiner—David C. Nelms
Assistant Examiner—Eric F. Chatmon
Attorney, Agent, or Firm—Richard J. Donahue; Donald J. Singer

[57] ABSTRACT

A system and method for large angle off-axis steering of the composite beam from a phased array telescope system.

2 Claims, 2 Drawing Sheets

BEFORE TILT INJECTION

AFTER TILT INJECTION

AFTER PISTON CORRECTION

LARGE ANGLE OFF-AXIS BEAM STEERING OF A PHASED TELESCOPE ARRAY

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to a system and technique for steering the direction of propagation of a beam of electromagnetic energy, and more particularly to a system and method for increasing the range of off-axis pointing of a composite laser beam emanating from a phased array of optical telescopes.

The concept of optically phasing an array of laser telescopes in a manner to achieve the most optical power on-axis at a distant stationary object is presently known. Apparatus and a technique for implementing such a concept are disclosed, for example, in U.S. Pat. No. 4,639,586, issued to Janet S. Fender et al on Jan. 27, 1987, which patent is incorporated herein by reference.

The phasing of the telescopes in the Fender et al patent is accomplished by sampling their outgoing wavefronts, and generating correction signals therefrom that are applied to correction mirrors via mirror control mechanisms. The mirror control mechanisms effect a fine dynamic control of the optical path lengths through the telescopes to provide a zero optical path difference condition.

The aforementioned Fender et al patent also discloses an image processor system and an associated algorithm for generating the required correction mirror control signals. This image processor system and algorithm are disclosed in greater detail in U.S. Pat. No. 4,689,758 issued to Richard A. Carreras on Aug. 25, 1987. The Carreras patent is also incorporated herein by reference.

The phased multiple telescope array systems and techniques disclosed in the Fender et al and Carreras patents have been developed and optimized to achieve the most optical power on-axis and on a stationary target. Therefore a figure of merit of the systems is the Point Spread Function which appears on a target plane, optimized for maximum intensity on-axis.

It is desirable in certain applications to have a phased multiple telescope array system in which the Point Spread Function can be steered to follow a moving target and thereby continuously deposit the maximum optical intensity on the target. The invention disclosed herein arose from an investigation of the problem of how to move the Point Spread Function over a large off-axis angle while still maintaining a phased outgoing wavefront.

To some degree, the small movable correction mirrors of the phased telescope system disclosed in the Fender et al patent can be used to steer, point or otherwise move the composite beam as it leaves the telescopes. This is a very desirable feature, since moving small steering mirrors is much easier than moving an entire telescope platform. An additional advantage of using such small mirrors is that they can be moved much faster and positioned much more accurately. However, because the range of the mirror dynamic control mechanisms is small, such systems have heretofore been unsuitable for moving target applications.

OBJECTS AND SUMMARY OF THE INVENTION

It is therefore the primary object of the present invention to provide a system and technique for steering a beam of electromagnetic energy.

It is a more specific object of the present invention to provide an improved system and method for steering the composite beam produced by a phased array of telescopes.

It is a feature of the present invention that the dynamic range of off-axis steering of a phased telescope array is greatly increased.

In accordance with the present invention, control signals are applied to both the coarse movement and fine movement elements of each mirror control mechanism of a phased telescope array. The control signals vary in accordance with an algorithm which "offloads" a fine movement element when it approaches its limited range of travel, by causing the appropriate movement of its associated coarse movement element. The dynamic range of steering of the composite beam from the phased telescope array is thereby greatly increased.

The foregoing, together with other objects, features and advantages of the present invention will be readily apparent to those skilled in the pertinent art from the following detailed description of a preferred embodiment of the invention when read in conjunction with the accompanying drawings, wherein like elements are given like reference numerals throughout.

DETAILED DESCRIPTION OF THE PREFERRED EMBODIMENT

The present invention utilizes, in a preferred embodiment thereof, three optical path difference adjusters (OPDA's) whose correction mirrors are arranged so as to control the optical path lengths of three phased telescopes. Such an arrangement for two or more phased telescopes is disclosed in the aforementioned Fender et al patent.

Figure 1:
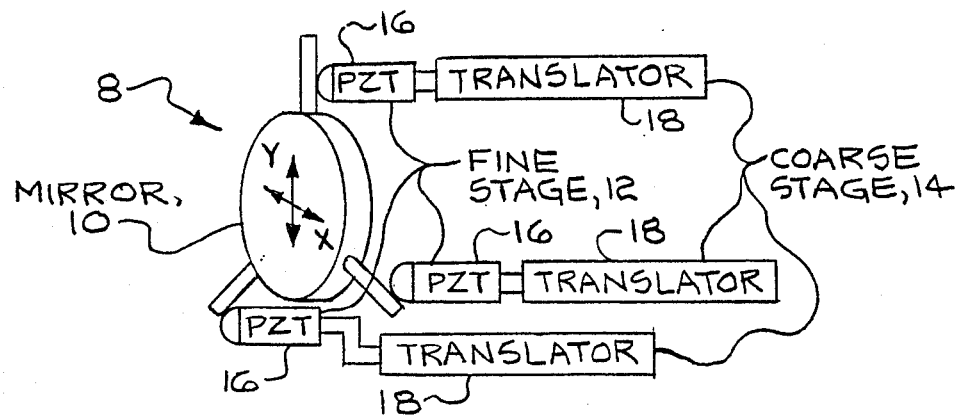
FIG. 1 is a pictorial representation of an optical path difference adjuster (OPDA) which may be used in conjunction with the present invention.

As seen in FIG. 1, each OPDA device 8 comprises a steerable mirror 10 from which laser light can be accurately directed. The OPDA used in the present invention has two stages, a FINE stage 12 and a COARSE stage 14. Previous attempts to provide dynamic off-axis steering were confined to the use of only the FINE stage 12 of an OPDA.

FINE stage 12 movement is produced by three piezoelectric transducer (PZT) elements 16, which can resolve up to 500 nanoradians of optical angular movement with a frequency response of 2 kilohertz. The three PZT elements 16 are used to "tilt" mirror 10 about the Y-axis or X-axis.

A disadvantage of using only the FINE stage PZT elements 16, is that their dynamic range is limited to about only 100 microradians of angular steering. However, as seen in FIG. 1, the OPDA is also equipped with a COARSE stage 14 whose movement is accomplished by three electromechanical translator elements 18, which are of known construction and are commercially available. This COARSE stage 14 has been previously used for only static manual piston adjustments, such as to bring the OPDA within the capture range of FINE stage 12. By piston adjustment is meant movement along an axis perpendicular to the plane of the mirror 10 surface. COARSE stage 14 has a resolution of only 0.13 micrometers as compared to the resolution of FINE stage 12 of 5 nanometers. However, the COARSE stage 14 has a dynamic control piston movement range of plus or minus 1.5 millimeters. The system and method described below utilizes a technique where the translator elements 18 of COARSE stage 14 are used to dynamically "offload" the PZT elements 16 of FINE stage 12 in order to increase the angular steering range of the OPDA mirror 10.

Figure 2:
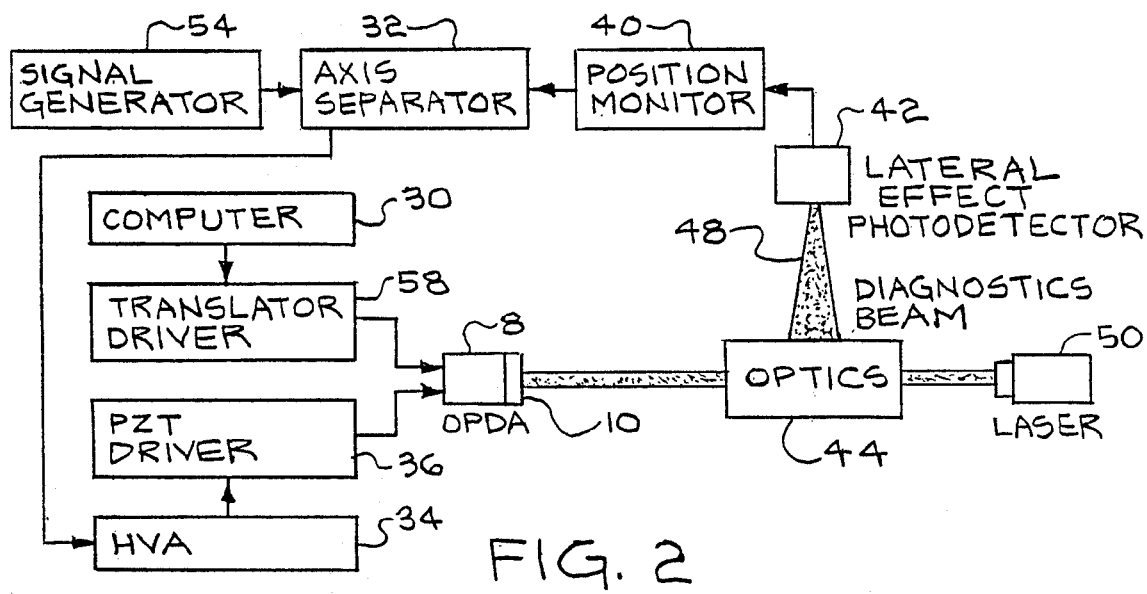
FIG. 2 is a block diagram representation of the beam steering system of the present invention.

The additional system components used to implement the large-angle, off-axis pointing system and method of the present invention are shown in FIG. 2. A general purpose computer 30 is the main controller of the COARSE stage translator elements 18 of the OPDA's and it is on computer 30 that the large-angle, off-axis steering algorithm is implemented. Axis separator 32 is comprised of a controller which determines the amount and direction of movement of an OPDA, and has an electronic translator therein which translates the amount and direction into individual PZT element 16 movements by way of high voltage amplifiers 34 and PZT drivers 36. A disclosure of an axis separator is found in United States patent application Ser. No. 941,480 filed by R. Carreras et al on Dec. 15, 1986 and entitled "Axis Separator Electronic Translator". This application has been allowed and is incorporated herein by reference.

Axis separator 32 and its fine movement hardware along with a position monitor 40 and a lateral effect photodetector 42 make up a small closed-loop hardware system providing closed loop tilt control. The closed loop tilt control removes any tilt in the OPDA beam path by appropriately driving the three tilt PZT elements 16 of each OPDA. This is accomplished as follows: The optics 44 of a phased array focus a diagnostics laser beam 48 from laser source 50 (and deflected from OPDA 8) onto lateral effect photodetector 42. Lateral effect photodetector 42 together with position monitor 40 senses the X-tilt and Y-tilt in OPDA 8 by the X and Y positions of the beam on detector 42. Position monitor 40 outputs the X-tilt and Y-tilt to axis separator 32 which calculates, in hardware, the tilt correction signals for the three tilt PZT elements 16 of OPDA 8, and axis separator 32 outputs the tilt correction signals to the three PZT elements 16 via the high voltage amplifiers 34.

Figure 3:
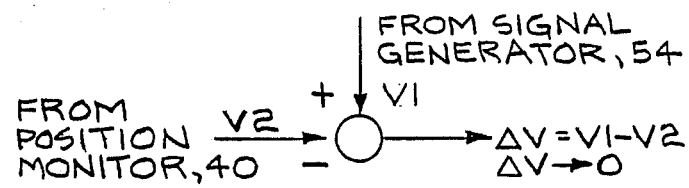
FIG. 3 is a schematic representation of the signal summing which occurs within the beam steering system of the present invention.

In order to tilt the mirror 10 of OPDA 8 for pointing or steering, a signal is injected into axis separator 32. Signal generator 54 is used to cause the input voltages of the PZT elements 16 to be driven from their nominal value of −750 volts dc towards one of the voltage limits of 0 volts or −1500 volts dc. The tilt control system for the OPDA 8 used in this configuration steers OPDA 8 in the direction determined by the polarity of the input signal from signal generator 54. The amount and direction of control strives to maintain zero error at the point where the tilt signals from position monitor 40 are summed with the signals from signal generator 54. FIG. 3 illustrates this concept.

Since the PZT elements 16 have a finite range (18 micrometers) the signal from signal generator 54 must be kept within a range of approximately plus or minus one volt peak to peak. Otherwise this maximum range would be exceeded. Unfortunately this range equates to very small movements on photodetector 42 with the optics chosen. The method to be described below allows movement over the entire linear range of photodetector 42. The technique is an "offloading" of the PZT element 16 control voltages. Since the PZT elements 16 and translator elements 18 are "piggybacked", the required movement of a PZT element 16 can be accomplished by moving the associated electromechanical tranalator element 18 instead.

The large angle off-axis pointing method of the present invention takes advantage of the relatively large mechanical range of the coarse movement of mirror 10 by translator elements 18. The method is accomplished as follows:

(a) Computer 30, which drives the coarse movement translator elements 18, also monitors the high voltages provided by high voltage amplifiers 34 to the PZT elements 16.

(b) Signal generator 54 injects a slightly larger input voltage into either the X or Y input of axis separator 32.

(c) If the three voltages are within a prescribed range from their nominal values, computer 30 returns to step (b).

(d) If any of the three voltages exceeds the algorithm's voltage range, offloading is initiated. Offloading is the process by which translator elements 18 are driven via their associated translator element drivers 58 in a direction such that the tilt error which was being corrected by the PZT's 16 is now being corrected by the translator elements 18. The PZT's 16 are then centered near their nominal range and can now be driven again by a large injected signal produced by signal generator 54.

(e) Steps (b–d) are repeated.

The process of injecting larger and larger signals and removing the bias on the PZT elements 16 by offloading eventually produces a large tilt on the associated mirror 10, thus accomplishing the desired large angle off-axis pointing.

By injecting a sinusoidal signal into one of the X or Y inputs to axis separator 32, mirror 10 will point off-axis in both the negative and positive directions in either X and Y tilt. This is equivalent to dithering an OPDA in a single direction.

If a sinusoidal signal is injected into both the X and Y inputs to axis separator 32, with a phase shift on one of the inputs, the OPDA will form a lissajous pattern on lateral effect photodetector 42. All of the aforementioned options have been successfully tested.

Figure 4A:
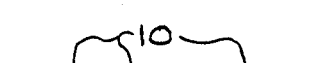
FIG. 4A depicts the relative positions of the three OPDA mirrors used in the preferred embodiment of the present invention prior to the application of tilt correction signals thereto.
Figure 4B:
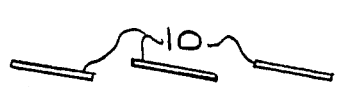
FIG. 4B depicts the relative positions of the three OPDA mirrors used in the preferred embodiment of the present invention after the application of tilt correction signals thereto.
Figure 4C:
FIG. 4C depicts the relative positions of the three OPDA mirrors used in the preferred embodiment of the present invention after both tilt and piston correction signals have been applied thereto.

The preferred embodiment of a phased telescope array mentioned earlier herein has not just one OPDA, but three. The optical path difference (piston error) between them must be zero. FIG. 4A illustrates the alignment of three mirrors 10 prior to the application of any tilt signal thereto. As can be seen in FIG. 4B, putting the same tilt on all three mirrors 10 injects a piston error into the system. The large off-axis pointing technique described herein corrects for this piston error after each pass through the off-loading algorithm. This results in the mirrors 10 having the same tilt and no piston error between them as shown in FIG. 4C.

Figures 5, 6:
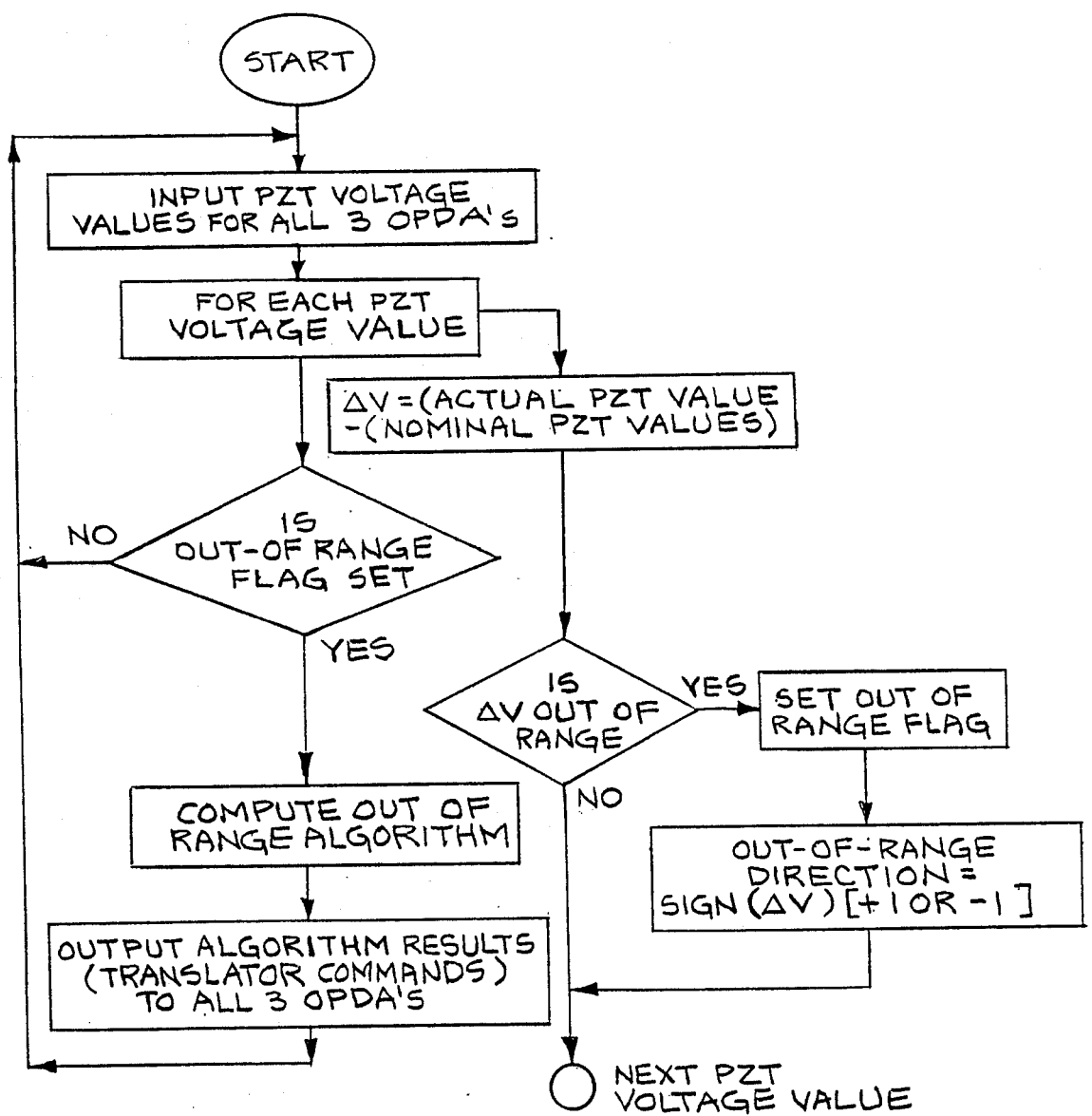
FIG. 5 depicts the algorithm flowchart of the present invention.
FIG. 6 depicts the out-of range algorithm of the present invention.

The software flow chart for performing the tilt offloading algorithm is shown in FIG. 5, and the out-of-range algorithm is shown in FIG. 6 of the drawings. Some available options are adjusting the deviation from the nominal to begin the offloading process, and selecting the translator element travel desired. It should be noted that there is a linear relationship between deviation voltage and translator element travel. This relationship must be relatively maintained. Otherwise, an oscillation of the mirror movement might occur.

The present invention provides a 2,500 percent improvement in pointing angle range over previous methods. Moreover, this large pointing or steering range is accomplished while maintaining phase and boresight. This is far superior to previous techniques which require breaking phase and boresight during the transition period.

While the invention has been described in its presently preferred embodiment, it will be understood that changes within the purview of the appended claims may be made without departing from the scope and spirit of the invention.

What is claimed is:

1. A method for providing large angle off-axis steering of a composite beam formed by a phased array of telescopes, each of said telescopes having an optical path difference adjuster (OPDA) device with a correction mirror whose fine positioning is accomplished by a plurality of piezo-electric transducer (PZT) elements, and whose coarse adjustment is accomplished by electromechanical translator elements which move said PZT elements, said method comprising the steps of:
   (a) monitoring the signal voltages applied to each of said PZT elements;
   (b) varying the amplitude of the signal voltage applied to each PZT element by a prescribed incremental voltage of the proper polarity to tilt its associated correction mirror and thereby steer the beam reflected therefrom towards a desired new position;
   (c) determining if the amplitude of the signal voltage applied to each PZT element is still within a prescribed range from its nominal voltage value, and if so, returning to step (b);
   (d) applying a drive signal to each electromechanical translator element associated with a PZT element whose prescribed range has been exceeded to reposition the PZT element and thereby offload the signal voltage applied thereto and establish a new signal voltage value thereon substantially equal to its nominal voltage value; and
   (e) repeating steps (b-d) until the desired steering angle has been achieved.

2. A system for providing large angle off-axis steering of a composite beam emanating from a phased optical telescope array comprising:
   a plurality of phased telescopes each having an optical path difference adjuster (OPDA) associated therewith;
   each said OPDA comprising a correction mirror, a plurality of piezo-electric transducer (PZT) elements coupled to said mirror and together forming a fine adjustment stage for said mirror, and a plurality of electromechanical translator elements each coupled to one of said plurality of PZT elements to move said PZT elements and together forming a course adjustment stage for said mirror;
   photodetector means for detecting the beam emanating from said array;
   position monitor means coupled to said photodetector means for providing X-Y coordinate signals indicative of the position of said beam on said photodetector means;
   signal generating means for generating beam steering signals;
   axis separator means for receiving said X-Y coordinate signals from said position monitor means, for receiving said beam steering signals from said signal generating means and for applying resultant tilt correction voltages to each of said PZT elements of each said OPDA; and
   computer means for monitoring said tilt correction voltages, and for providing a drive signal to an electromechanical translator element when the amplitude of a tilt correction voltage applied to its associated PZT element exceeds a predetermined range of amplitudes.

* * * * *